(No Model.) 3 Sheets—Sheet 1.
J. R. H. HINTON.
STOP OR BRAKE MECHANISM AND WIRE SUPPORT FOR CASH CARRIER SYSTEMS.
No. 286,133. Patented Oct. 2, 1883.
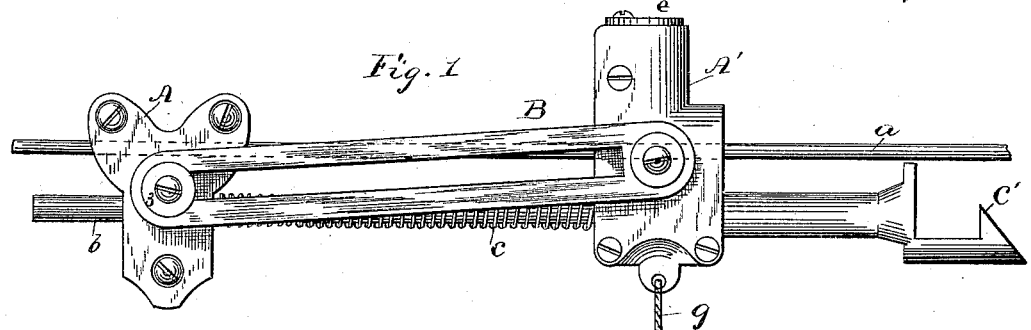
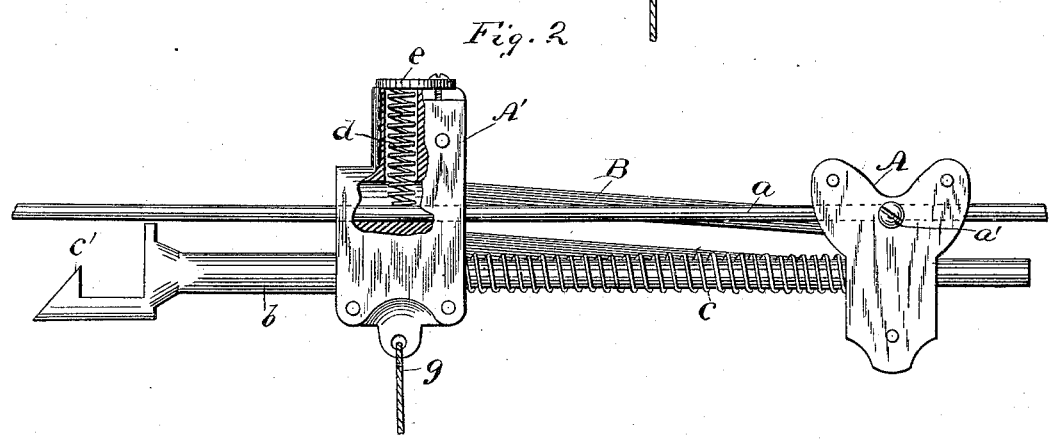
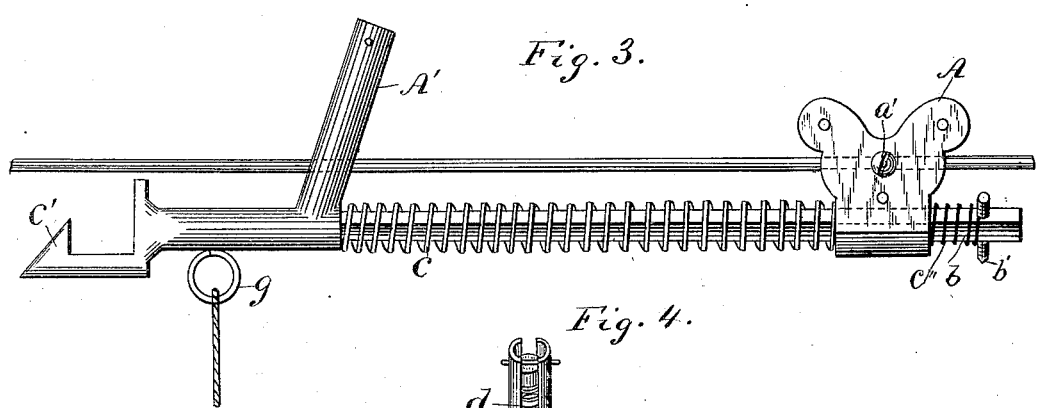
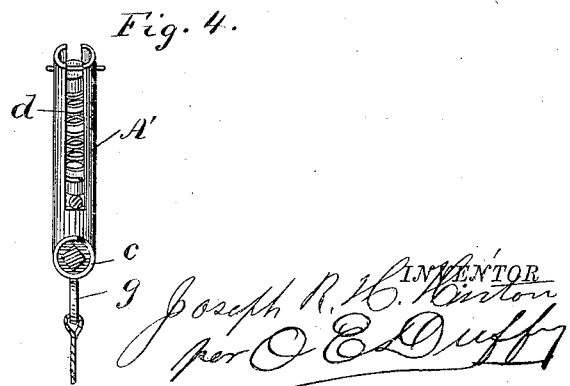
WITNESSES
Chas. R. Burr
W. E. Bowen
INVENTOR
Joseph R. H. Hinton
per O. E. Duff
Attorney (No Model.) 3 Sheets—Sheet 2.
J. R. H. HINTON.
STOP OR BRAKE MECHANISM AND WIRE SUPPORT FOR CASH CARRIER SYSTEMS.
No. 286,133. Patented Oct. 2, 1883.
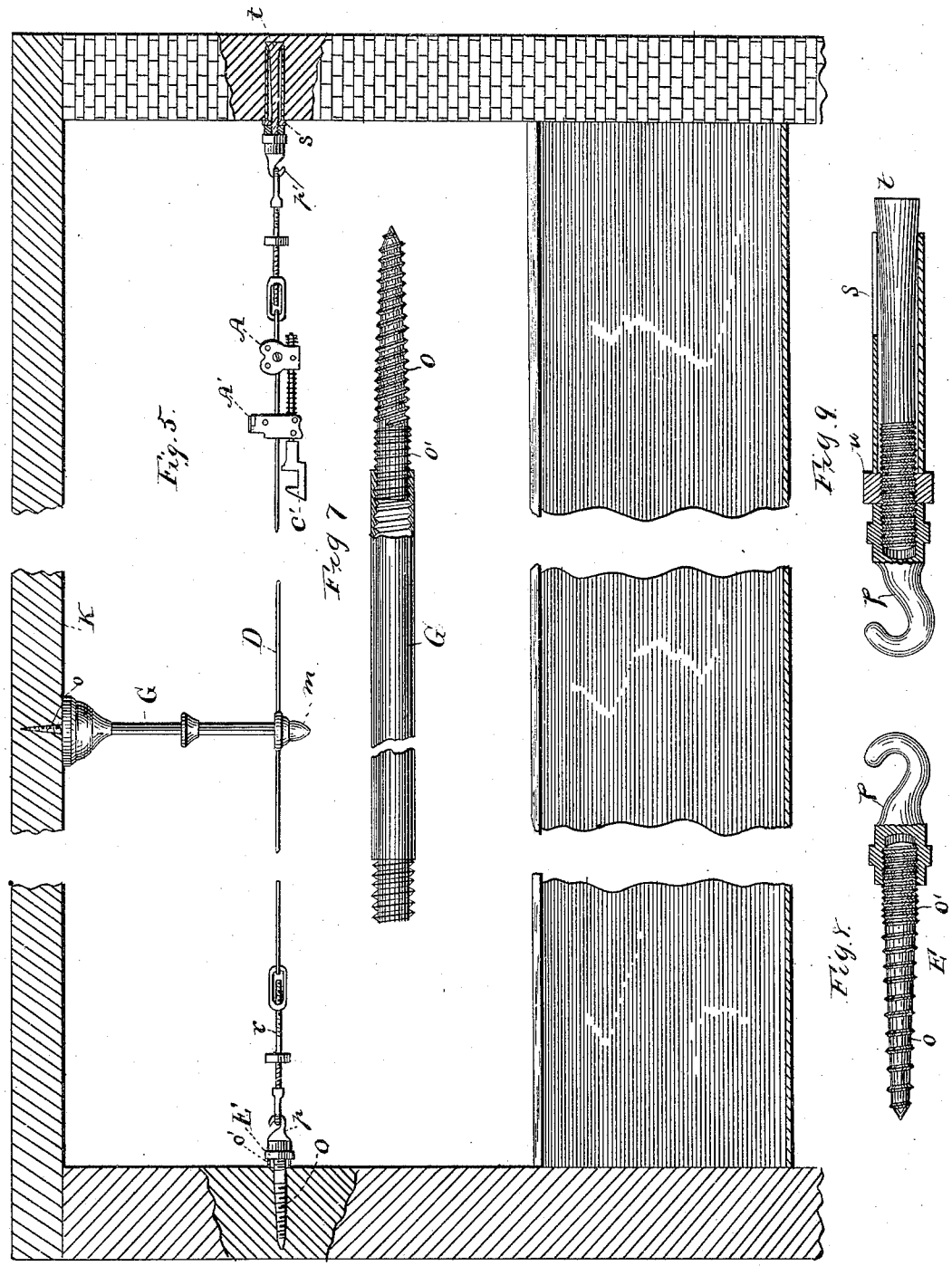
WITNESSES
W E Bowen
Chas. R. Burr
INVENTOR
Joseph R. H. Hinton
per O E Duff
Attorney (No Model.)  J. R. H. HINTON.  3 Sheets—Sheet 3.
STOP OR BRAKE MECHANISM AND WIRE SUPPORT FOR CASH CARRIER SYSTEMS.
No. 286,133.  Patented Oct. 2, 1883.
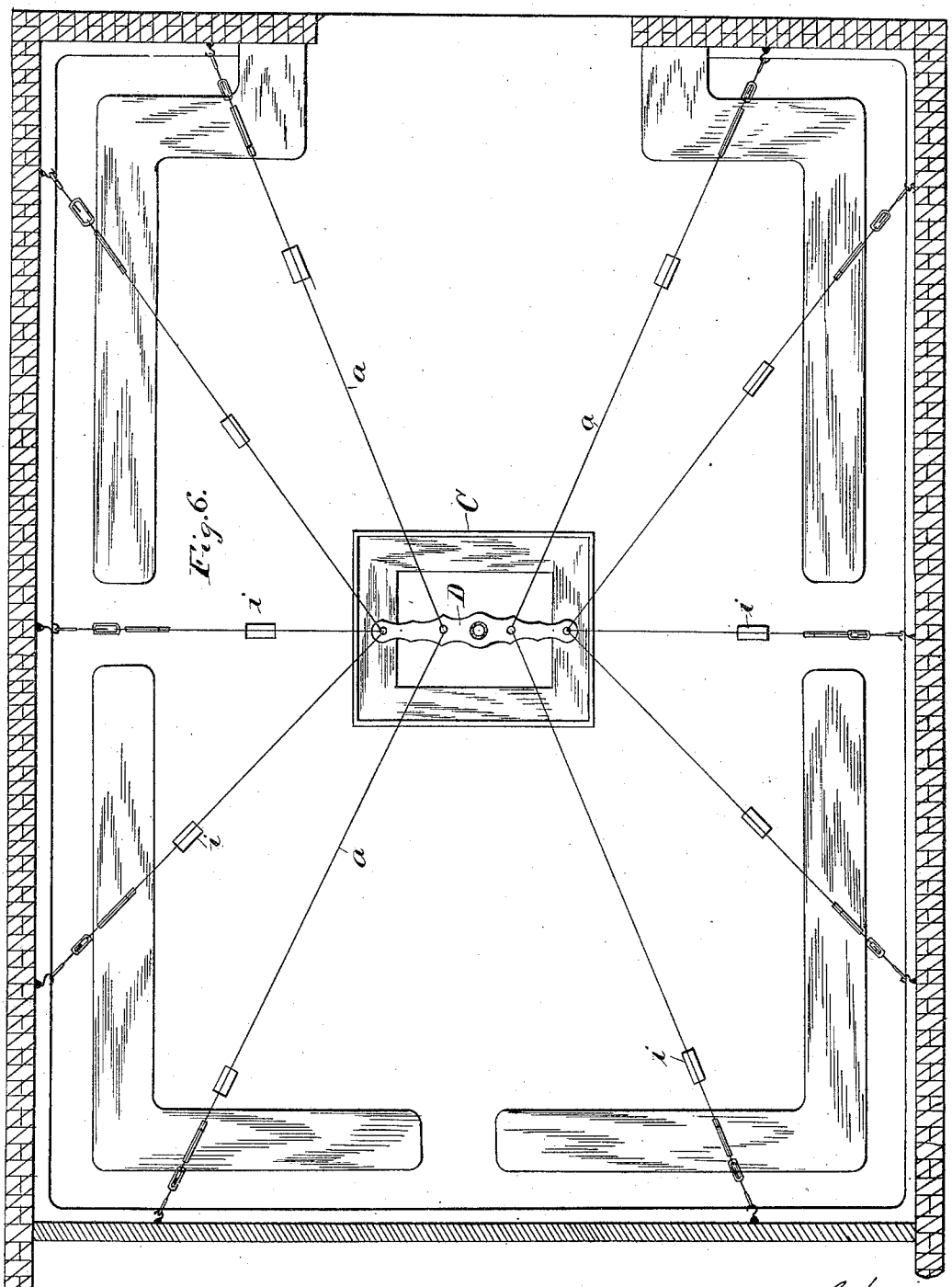
WITNESSES
Chas. R. Burr
W. E. Bowen
INVENTOR
Joseph R. H. Hinton
per O. E. Duff
Attorney

UNITED STATES PATENT OFFICE.

JOSEPH R. H. HINTON, OF BALTIMORE, MARYLAND, ASSIGNOR TO THE CONTINENTAL CASH CAR COMPANY, OF SAME PLACE.

STOP OR BRAKE MECHANISM AND WIRE-SUPPORT FOR CASH-CARRIER SYSTEMS.

SPECIFICATION forming part of Letters Patent No. 286,133, dated October 2, 1883.

Application filed September 7, 1883. (No model.)

*To all whom it may concern:*

Be it known that I, JOSEPH R. H. HINTON, of Baltimore, in the county of Baltimore and State of Maryland, have invented certain new and useful Improvements in Stop or Brake Mechanism and Wire-Supports for Cash-Carrying Systems; and I do hereby declare that the following is a full, clear, and exact description of the invention, which will enable others skilled in the art to which it appertains to make and use the same, reference being had to the accompanying drawings, and to the letters of reference marked thereon, which form part of this specification.

These improvements relate to that class of inventions known as "cash and parcel carrying systems" for stores and warehouses, having for their object to provide new and improved adjustable stop mechanism for the carrier at either or both ends of the wire upon which said carrier travels, whereby a yielding resistance is given the carrier as it is caught and retained at these points until again released by the operator; also to provide means for securing the ends of the wires to the walls at the various stations or counters of the salesroom, and a novel arrangement for supporting the wires at the cashier's desk or point to which they are all centered.

To these ends the invention consists in the construction and combination of the adjustable stop or brake mechanism with the wire or cable upon which the same is held, the devices for securing said wires to the wall, and the means whereby the same are supported at the cashier's desk, all as will be more particularly described hereinafter.

In the drawings, Figure 1 represents a side elevation of the adjustable stop or brake mechanism, showing a slotted arm by which it is held upright. Fig. 2 is a like view of the opposite side of the same with one of the brackets partly broken away to show the location therein of a spring. Fig. 3 is a side elevation of brake mechanism, showing one of the brackets as cast integral therewith, and dispensing with the slotted arm. Fig. 4 is a detail of Fig. 3. Fig. 5 is a side elevation of a cash-carrying system with the brake mechanism as it is supported on the wire or cable-way, and wherein is also shown the manner of securing the ends of the wires to the walls of a room, and the manner in which they are supported at the cashier's desk by devices depending from the ceiling. Fig. 6 is a plan view of a cash-carrying system wherein my improvements are embodied, and Figs. 7, 8, and 9 are details.

Reference being had to the letters marked thereon, A A' in Figs. 1 and 2 represent two clamps or brackets, which are made in two parts and held together by screws, as shown. The clamp A is rigid or stationary upon the wire $a$, on which the carrier $i$ travels, the lower or pull-down portion of which carrier I propose to make of leather, while the clamp or bracket A' is held rigid on a rod, $b$, whose end slides through the clamp A. On this rod, between and bearing against the clamps, is a spring, $c$, and said rod is enlarged in diameter at its inner end, and is formed with an inclined step or catch portion, $c'$. Held between the parts or sides of A', said parts being so formed on their inner face as to accommodate it, is a spring, $d$, whose bottom end bears down upon the wire $a$, that passes through the clamps, as shown.

B is an elongated slotted arm, which is secured to A' by a screw, and which, when the spring $c$ is compressed, slides on a screw, 3, fixed in the side of A. The object of this arm is to keep the clamps in an upright position on the rod, as otherwise they would swing around on account of said rod in this instance being round in cross-section.

$e$ is a cap screwed on top of A, by the removal of which the spring $d$ can be taken out.

In Fig. 2 is shown the form of brake which I prefer to adopt, (although both are thoroughly effective,) as it is more simple and cheaper to manufacture. In this case clamp A is the same, while clamp A' is formed integral with the larger part of rod $b$, and is hollow, resembling a longitudinally-divided tube, within which is held the spring $d$. (See Fig. 4.) By this construction I dispense with the slotted arm B, by virtue of having the smaller diameter of the rod $b$ square in cross-section to prevent turning of the clamps A.

$g$ is a ring by which, when it is desired to release the carrier $i$, the clamp A and rod $b$ are drawn down.

$a'$ is a set-screw by which clamp A is tightened to the wire.

The operation of both constructions of brake is the same.

$c''$ is a buffer-spring placed on the rod $b$ at its outer end, and between clamp A and a pin, b'. This spring serves to relieve shock or rebound of the car as it is caught.

Upon reference to Figs. 5 and 6 will be seen the devices by which the wires are supported to the walls and above the cashier's desk.

E represents a screw I employ for screwing into walls or partitions of wood to hold the wires. This screw is formed like a common wood-screw at its portion, o, which enters the wall, and is screw-threaded at o', for screwing thereon the hook p, which holds a turn-buckle, r, fastened to the end of the wire, and by which said wire may be given increased tension or made more taut.

C represents the desk, which has secured in the ceiling K above it in like manner the screw E, having secured to its screw-threaded end a piece of ordinary pipe, G. (See Fig. 7.) This pipe is screw-threaded at its lower end, and on this end is screwed a perforated plate or bar, D, and a thimble or nut, m, is screwed to the end of the pipe beneath the plate, thus supporting the said plate. This plate has holes in it, in which the ends of the wires are fastened in any suitable manner. Should it be desired to lengthen the pipe G, the nut m can be taken off and an additional piece of pipe screwed on and the nut replaced, as before.

To the right of Fig. 5 is shown my manner of securing a support for the wire in walls of masonry. In this instance a hole is previously made in the wall, into which I drive the tube s, holding therein the bolt t, which gradually enlarges to a head. (See Fig. 9.) The tube s is split down the sides for a portion of its length, and on the smaller screw-threaded portion of the bolt t is a nut, u, and also to this end of the bolt is screwed hook p. By screwing up the nut u against the wall the bolt t is drawn in, which widens out or expands the split end of the tube against the sides of the hole, and thus is the support made firm and secure. Any slack in the wire occasioned thereby may be taken up by the turn-buckle, as explained.

Operation: The bottom of the carriers are to be provided with a lug or shoulder, and the said carrier, having been propelled along the wire, when it reaches the end, comes in contact with clamp A', and is allowed a yielding resistance by the compression of spring c, caused by movement of said clamp and rod b. The lug on the bottom of the carrier moves up the incline c' of the rod, and by it is caught and retained until released by the operator. To release it, it is simply necessary to take hold of ring g and pull downward, which action compresses spring d and draws down the clamp A and rod, thus releasing the carrier. Upon letting go of the ring g the resiliency of spring d restores the parts to their normal positions.

Having thus described my invention, what I claim is—

1. In a cash-carrying system, the combination of the wire a, turn-buckle r, and screw E, the threads on said screw being formed substantially as and for the purpose set forth.

2. In a cash-carrying system, the combination of the pipe G, screw o o', perforated plate D, nut m, and wires a, substantially as shown and described.

3. In a cash-carrying system, the stop consisting of the combination of the tube s, bolt t, nut u, and hook, with the turn-buckle r and wire a, substantially as shown and described.

4. In a cash-carrying system, the combination, with the suspended wire, of clamps A A', slotted bar B, rod b, and spring c, said rod being formed with the inclined step, substantially as described.

5. In a cash-carrying system, the combination of the rod formed as described, with the stationary clamp A, spring c, slotted bar B, wire a, and sliding clamp A', said clamp having within it the spring d, and provided with ring g, substantially as and for the purpose set forth.

6. In a cash-carrying system, the combination, with the rod b, of the clamps A A', said clamps formed of two parts and adapted to be detached from said rod, substantially as described.

7. In a cash-carrying system, the rod b, having the bracket A' integral therewith, in combination with springs c d, the suspended wire, and clamp or bracket A, said clamp having set-screw a', substantially as described.

8. In a cash-carrying system, the combination, with the brake mechanism consisting of the clamps, rod b, and springs c d, of the suspended wire, and a carrier adapted to travel said wire, so formed on its under surface as to be caught by said brake.

9. A stop for elevated ways, adapted to be adjustably secured thereto, and said stop having an arresting end, an abutting-spring, and a releasing-spring, substantially as set forth.

10. A stop for elevated ways, adapted to be adjustably secured thereto, and provided with an arresting end, an abutting-spring, a releasing-spring, and means for operating said releasing-spring, substantially as set forth.

11. In a stop for elevated ways, the combination, with said stop, of the abutting-spring, the rod and clamp cross-head, and the buffer-spring, substantially as described.

In testimony that I claim the foregoing as my own I hereunto affix my signature in presence of two witnesses.

JOSEPH R. H. HINTON.

Witnesses:
THOS. KELL BRADFORD,
MILTON CLARK.